US008299898B2

(12) United States Patent
Oh et al.

(10) Patent No.: US 8,299,898 B2
(45) Date of Patent: Oct. 30, 2012

(54) APPARATUS AND METHOD FOR MANAGING RADIO FREQUENCY INDENTIFICATION READER

(75) Inventors: Se Won Oh, Daejeon (KR); Hyo Chan Bang, Daejeon (KR); Yong Joon Lee, Daejeon (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 753 days.

(21) Appl. No.: 12/176,661

(22) Filed: Jul. 21, 2008

(65) Prior Publication Data

US 2009/0134974 A1 May 28, 2009

(30) Foreign Application Priority Data

Nov. 27, 2007  (KR) .................. 10-2007-0121326

(51) Int. Cl.
H04Q 5/22 (2006.01)
(52) U.S. Cl. ................................... 340/10.1
(58) Field of Classification Search .............. 375/259; 726/1; 340/10.4, 10.1, 572.1; 705/1
See application file for complete search history.

(56) References Cited

U.S. PATENT DOCUMENTS

| 5,257,194 | A  | * | 10/1993 | Sakita ........................... 701/117 |
| 6,466,260 | B1 | * | 10/2002 | Hatae et al. .................... 348/149 |
| 6,700,504 | B1 | * | 3/2004 | Aslandogan et al. ......... 340/901 |
| 6,810,328 | B2 | * | 10/2004 | Yokota et al. .................. 701/414 |
| 6,970,518 | B2 | * | 11/2005 | Kuffner et al. ................ 375/259 |
| 7,196,613 | B2 | * | 3/2007 | Horwitz et al. .............. 340/10.1 |
| 7,340,559 | B2 |   | 3/2008 | Ito et al. |
| 7,489,240 | B2 | * | 2/2009 | Soliman ..................... 340/572.1 |
| 7,624,424 | B2 | * | 11/2009 | Morita et al. ...................... 726/1 |
| 7,920,050 | B2 | * | 4/2011 | Juels et al. .................... 340/10.4 |
| 2006/0145813 | A1 |   | 7/2006 | Haller et al. |
| 2006/0149566 | A1 | * | 7/2006 | Lin ................................... 705/1 |
| 2007/0035396 | A1 | * | 2/2007 | Chand et al. ............... 340/572.1 |
| 2007/0103303 | A1 |   | 5/2007 | Shoarinejad |
| 2007/0229216 | A1 |   | 10/2007 | Yasuda |
| 2007/0279189 | A1 |   | 12/2007 | Park |
| 2008/0042807 | A1 |   | 2/2008 | Park et al. |
| 2008/0215202 | A1 | * | 9/2008 | Breed ............................. 701/25 |

FOREIGN PATENT DOCUMENTS

| JP | 2000-003492 A | 1/2000 |
| JP | 2006-344054 A | 12/2006 |
| JP | 2007-249438 A | 9/2007 |
| KR | 1020060031032 A | 4/2006 |
| KR | 10-2006-0070188 | 6/2006 |
| KR | 10-2006-0070285 | 6/2006 |
| KR | 1020060112805 A | 11/2006 |
| KR | 10-0718096 | 5/2007 |
| WO | 2006/030497 A1 | 3/2006 |
| WO | 2006-068338 | 6/2006 |

* cited by examiner

Primary Examiner — Jennifer Mehmood
Assistant Examiner — Kaleria Knox
(74) Attorney, Agent, or Firm — Kile Park Goekjian Reed & McManus PLLC

(57) ABSTRACT

An apparatus for managing a plurality of RFID readers includes a service policy managing unit that defines demands in the form of service policies to be understood by the plurality of RFID readers, a data processing rule managing unit that generates a data processing rule on the basis of the service policies, a collected data processing unit that receives a plurality of RFID tag data from the plurality of RFID readers, and generates integrated RFID events by applying the data processing rule to the plurality of RFID tag data, and a service report processing unit that provides results corresponding to the integrated RFID events.

8 Claims, 4 Drawing Sheets

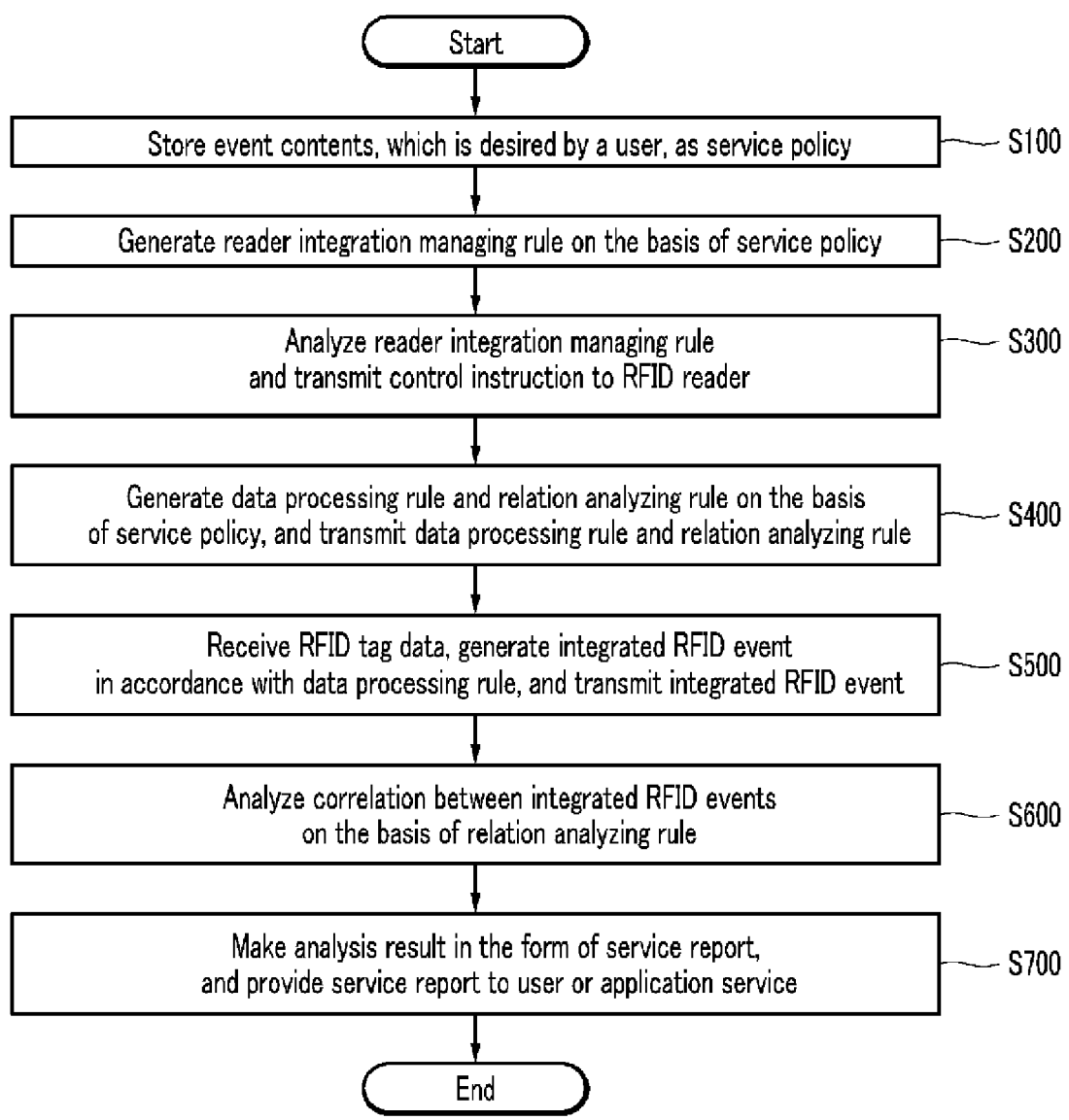

APPARATUS AND METHOD FOR MANAGING RADIO FREQUENCY INDENTIFICATION READER

CROSS-REFERENCE TO RELATED APPLICATION

This application claims priority to and the benefit of Korean Patent Application No. 10-2007-0121326 filed in the Korean Intellectual Property Office on Nov. 27, 2007, the entire contents of which are incorporated herein by reference.

BACKGROUND OF THE INVENTION (a) Field of the Invention

The present invention relates to an apparatus and method for managing a radio frequency identification (RFID) reader.

The present invention is supported by the IT R&D program of MIC/IITA [2007-S-024-01, Development of SSI(Software System Infrastructure) Platform Technology for Advanced RFID services].

(b) Description of the Related Art

RFID reader management technology is used to discriminate an RFID tag existing in a recognition range of a specific RFID reader by controlling the specific RFID reader. Various level software solutions, such as a reader adaptor for transmitting control instructions to an RFID reader, RFID middleware for generating an event by interpreting collected RFID tag data, and the like, are used in the RFID reader management technology.

In this case, the RFID tag and the RFID reader have peculiar characteristics depending on frequency bandwidth or electric power that is supported by a corresponding device, a communication method, and the rate of transmitted/received data. That is, when auxiliary electric power is used for communication between the RFID tag and the RFID reader, a read range is increased. A read range and data transmission speed depend on the frequency bandwidth and frequency wavelength of the RFID reader.

Therefore, when different kinds of RFID tags should be simultaneously used, different RFID readers for communicating with the respective RFID tags should be simultaneously controlled to collect data. For example, when a RFID tag using ultrahigh frequency (UHF) having a band of 900 MHz and a RFID tag using high frequency (HF) having a band of 13.56 MHz are used together to exactly discriminate airfreight, two kinds of RFID readers for recognizing the RFID tags should be simultaneously controlled.

Since individual instructions should be transmitted to each of the RFID readers in order to simultaneously control the RFID readers having different frequency bandwidths as described above, it is not possible to perform consistent control. Further, when each of the RFID readers is controlled by individual instructions, there is a problem that data collected by the RFID reader should be separately processed. Therefore, there is a demand for an apparatus and method capable of consistently controlling RFID readers and RFID tags that have different frequency bandwidths.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for managing an RFID reader that can integrally control RFID readers having different characteristics and provide high-level service information by using data collected from RFID tags having different characteristics.

According to an embodiment of the present invention, an apparatus for managing a plurality of RFID readers includes a service policy managing unit that defines demands in the form of service policies to be understood by the plurality of RFID readers, a data processing rule managing unit that generates a data processing rule on the basis of the service policies, a collected data processing unit that receives a plurality of RFID tag data from the plurality of RFID readers and generates integrated RFID events by applying the data processing rule to the plurality of RFID tag data, and a service report processing unit that provides results corresponding to the integrated RFID events.

According to another embodiment of the present invention, there is provided a method of driving an apparatus for managing a plurality of RFID readers receiving a plurality of RFID tag data. The method includes defining demands, which are desired by a user or an application service, in the form of service policies to be understood by the plurality of RFID readers; generating a data processing rule, which is used to process the plurality of RFID tag data, on the basis of the service policies, generating integrated RFID events by applying the data processing rule to the plurality of RFID tag data, and comparing the integrated RFID events in accordance with a relation analyzing rule.

According to still another embodiment of the present invention, there is provided a method of driving an apparatus for managing a plurality of RFID readers. The method includes storing demands as service policies that include conditions and actions corresponding to the conditions, receiving a plurality of RFID tag data from the plurality of RFID readers by applying a first rule that is generated in accordance with the conditions and actions of the service policies, converting the plurality of RFID tag data into integrated RFID events by applying a second rule that is generated in accordance with the conditions and actions of the service policies, and analyzing the integrated RFID events in accordance with a third rule that is generated in accordance with the conditions and actions of the service policies, and providing analyzed results.

BRIEF DESCRIPTION OF THE DRAWINGS

FIG. 5 is a flowchart illustrating a process for controlling the RFID reader in the apparatus for managing an RFID reader according to the exemplary embodiment of the present invention.

DETAILED DESCRIPTION OF THE EMBODIMENTS

Figure 1:
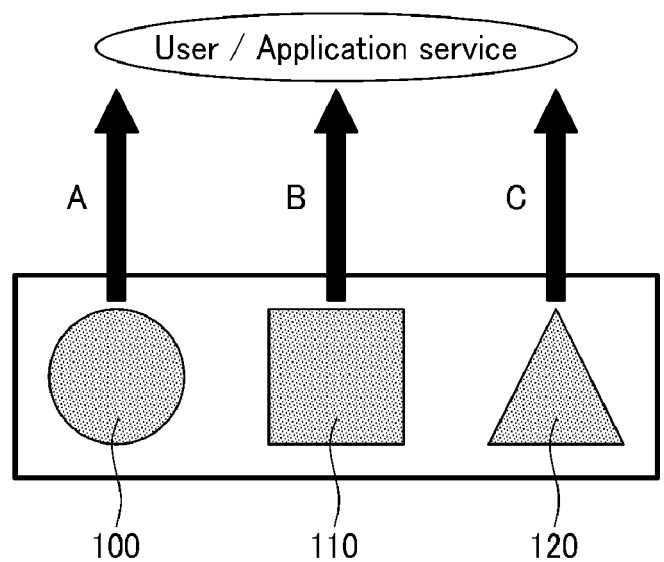
FIG. 1 is a view schematically showing an RFID system that has different frequency characteristics.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprise" and/or "comprising", when used in this specification, specify the presence of stated features, integers, steps, operations, elements, and/or components, but do not preclude the presence or addition of one or more other features, integers, steps, operations, elements, components, and/or groups thereof.

An RFID system according to an exemplary embodiment of the present invention will be described below with reference to FIGS. 1 and 2.

Figure 2:
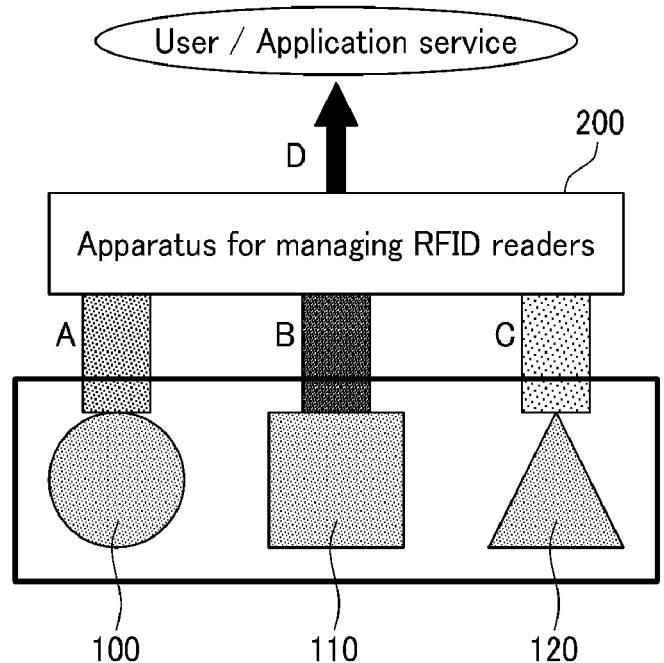
FIG. 2 is a view schematically showing an RFID system according to an exemplary embodiment of the present invention.

FIG. 1 is a view schematically showing an RFID system that has different frequency characteristics, and FIG. 2 is a view schematically showing an RFID system according to an exemplary embodiment of the present invention.

As shown in FIG. 1, the RFID system includes RFID readers 100, 110, and 120 that have different frequency characteristics.

Since having different frequency bandwidths, the RFID readers 100, 110, and 120 are individually controlled. Accordingly, a user or an application service receives low-level events A, B, and C from the different RFID readers 100, 110, and 120, respectively.

For example, if a vehicle belongs to HANKOOK PD Inc., the RFID reader 100 reads a vehicle tag and provides an event A, which represents that the vehicle belongs to HANKOOK PD Inc., to the user or the application service. If TV products are loaded in a container, the RFID reader 110 reads a container tag and provides an event B, which represents that TV products are loaded in the container, to the user or the application service. Further, if the number of boxes is larger than 20, the RFID reader 120 reads box tags and provides an event C, which represents that the number of boxes is larger than 20, to the user or the application service.

As described above, the RFID readers 100, 110, and 120 having different frequency characteristics are individually controlled, and provide low-level events to the user or the application service. The user or application service requires additional data processing in order to connect the events. Further, if a part of the RFID readers 100, 110, and 120 is replaced with an RFID reader having new frequency characteristics, there may be a problem in that a user or an application service should be developed again.

In order to solve the above-mentioned problem, an RFID system, which can integrally control RFID readers having different frequency characteristics, will be described in an exemplary embodiment of the present invention.

As shown in FIG. 2, an RFID system according to an exemplary embodiment of the present invention includes RFID readers 100, 110, and 120 having different frequency characteristics and an apparatus 200 for managing the RFID readers.

The apparatus 200 for managing the RFID readers controls the RFID readers 100, 110, and 120, provides total service information, and provides a high-level RFID service where the user or the application service and the individual events A, B, and C are integrated with each other.

For example, the apparatus 200 for managing the RFID readers controls the RFID reader 100 so that the RFID reader 100 reads the tag of a vehicle belonging to HAN KOOK PD Inc., and receives an event A, which represents that the vehicle belongs to HANKOOK PD Inc., from the RFID reader 100. The apparatus 200 for managing the RFID readers controls the RFID reader 110 so that the RFID reader 110 reads a tag of a container in which TV products are loaded, and receives an event B, which represents that the TV products are loaded in the container, from the RFID reader 110. Further, the apparatus 200 for managing the RFID readers controls the RFID reader 120 so that the RFID reader 120 reads tags of boxes of which the number is larger than 20, and receives an event C, which represents that the number of the boxes is larger than 20, from the RFID reader 120. Accordingly, the apparatus 200 for managing the RFID readers provides a high-level integrated event D by integrating information representing that the vehicle belongs to HANKOOK PD Inc., the TV products are loaded in the container, and the number of the boxes in the container is larger than 20.

The apparatus for managing an RFID reader according to an exemplary embodiment of the present invention will be described in detail below with reference to FIGS. 3 to 5.

Figure 3:
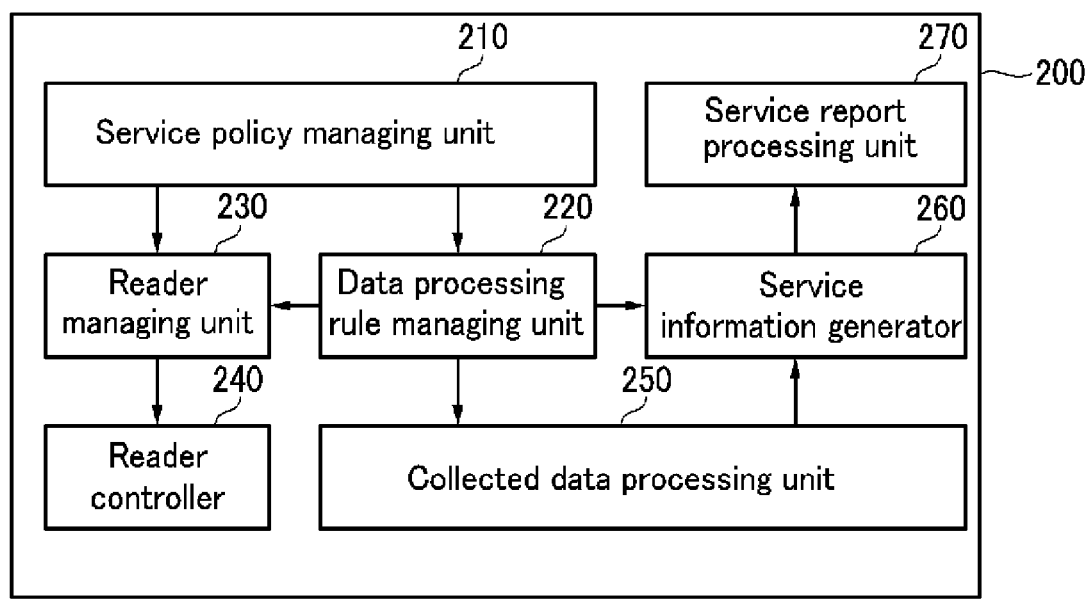
FIG. 3 is a block diagram of an apparatus for managing an RFID reader according to an exemplary embodiment of the present invention.
Figure 4:
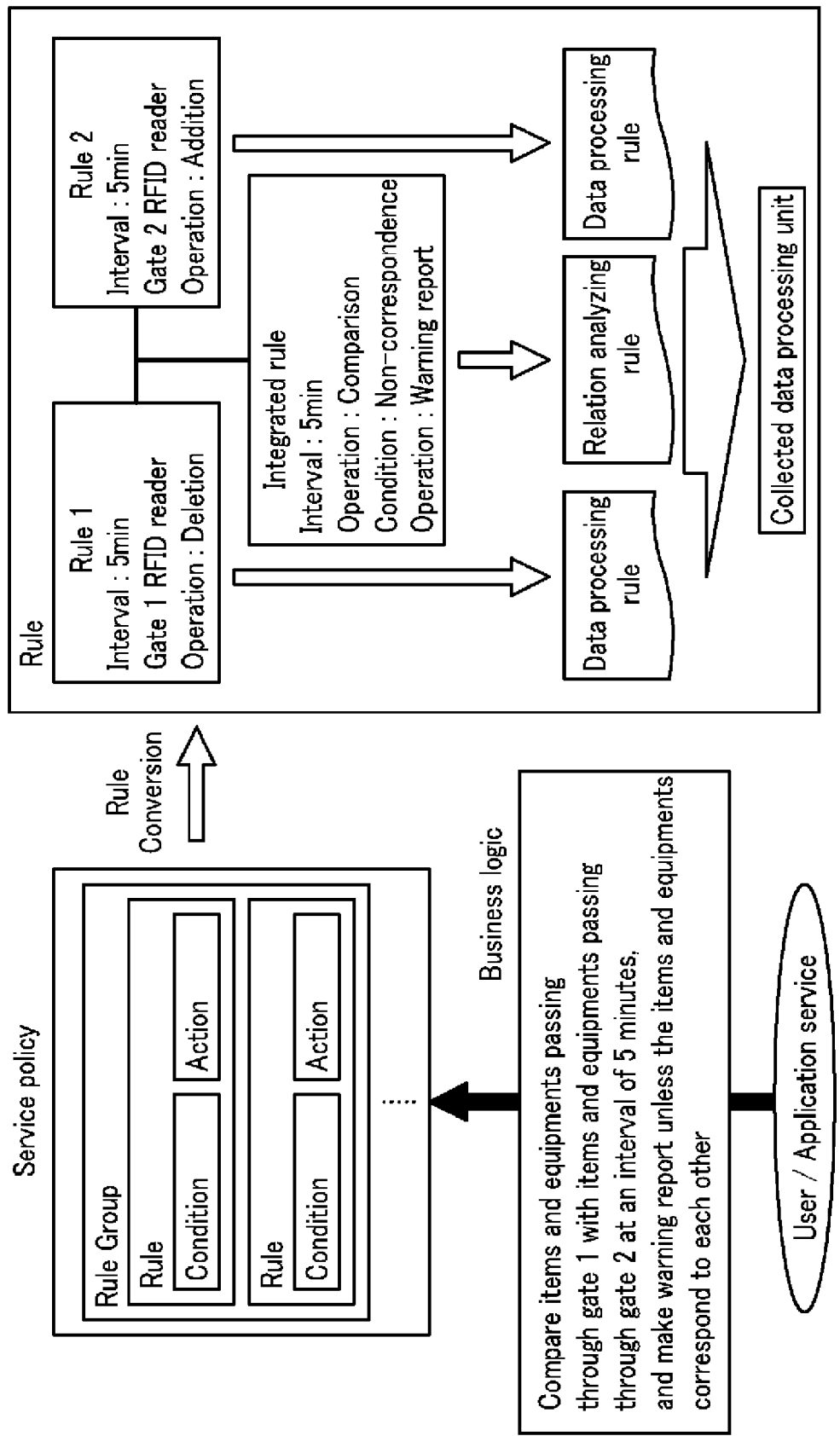
FIG. 4 is a view schematically illustrating a process for controlling an RFID reader in the apparatus for managing an RFID reader according to the exemplary embodiment of the present invention.

FIG. 3 is a block diagram of the apparatus for managing RFID readers according to the exemplary embodiment of the present invention, and FIG. 4 is a view schematically illustrating a process for controlling the RFID readers in the apparatus for managing RFID readers according to the exemplary embodiment of the present invention.

As shown in FIG. 3, the apparatus 200 for managing RFID readers includes a service policy managing unit 210, a data processing rule managing unit 220, a reader managing unit 230, a reader controller 240, a collected data processing unit 250, a service information generator 260, and a service report processing unit 270.

The service policy managing unit 210 defines a business logic, which is required to provide high-level service information desired by a user, in the form of a service policy (RFID service policy) that can be understood by the RFID reader. Then, the service policy managing unit stores the defined business logic. Further, the service policy managing unit 210 provides management tools so that a user can easily convert an abstract business logic into a service policy by using a graphical user interface (GUI) environment or an automatic compiler and describe the converted service policy.

The data processing rule managing unit 220 generates a data processing rule and a relation analyzing rule on the basis of the service policy generated by the service policy managing unit 210.

Specifically, the data processing rule managing unit 220 generates a data processing rule in order to process RFID tag data that are collected from different RFID readers, and stores the data processing rule in a database. Then, the data processing rule managing unit transmits the generated data processing rule to the collected data processing unit 250. In this case, the data processing rule specifies the contents of the processing of RFID tags data in due consideration of the logical RFID reader units, of which information can be looked up from the reader managing unit 230.

Further, the data processing rule managing unit 220 generates the relation analyzing rule in order to analyze the correlation between integrated RFID events that are generated in accordance with the data processing rule, and stores the relation analyzing rule in the database. Then, the data processing rule managing unit transmits the generated relation analyzing rule to the service information generator 260.

The reader managing unit 230 extracts a logical reader control instruction on the basis of the service policy generated by the service policy managing unit 210, generates a reader integration managing rule, stores the reader integration managing rule in the database, and transmits the generated reader integration managing rule to the reader controller 240. Further, the reader managing unit 230 grasps the states of different RFID readers that are currently connected thereto.

The reader controller 240 analyzes the reader integration managing rule transmitted from the reader managing unit 230, and transmits control instructions to each of the RFID readers. Further, the reader controller 240 receives and processes responses, which are transmitted from each of the RFID readers, in accordance with the control instructions.

The collected data processing unit 250 receives RFID tag data from each of the RFID readers that are controlled in accordance with the control instructions. Further, the collected data processing unit 250 integrates data as a logical unit in accordance with the data processing rule transmitted from the data processing rule managing unit 220, thereby generating an integrated RFID event. The collected data processing unit 250 transmits the generated integrated RFID event to the service information generator 260.

The service information generator 260 analyzes the correlation between integrated RFID events on the basis of the relation analyzing rule that is generated by the data processing rule managing unit 220, thereby generating high-level service information.

The service report processing unit 270 transmits the high-level service information, which is transmitted from the service information generator 260, to the user or the application service in real-time in the various forms of an object, an extensible markup language (XML) document, a message, and a load.

Referring to FIG. 4, the apparatus 200 for managing RFID readers manages demands from the user or the application service as service policies in order to connect the total management of the RFID readers, which have different frequency characteristics, with a business process. That is, whenever a new business process is generated, an application is not separately developed and the apparatus for managing RFID readers processes a demand corresponding to new business as a new service policy, so that high-level service information is provided.

In order to process the RFID tag data that are collected from the RFID readers having different frequency characteristics, the apparatus 200 for managing an RFID reader defines user's demands as service policies that are composed of conditions and actions corresponding to the conditions. Further, the apparatus 200 for managing an RFID reader analyzes the RFID tag data, which are collected from the RFID readers having different frequency characteristics, on the basis of the service policies, and provides high-level service information to the user or the application service.

TABLE 1

| List | Example |
| --- | --- |
| Service policy | "Compare RFID tag data passing through gate 1 with RFID tag data passing through gate 2 for 5 minutes, and make warning report unless the RFID tag data correspond to each other". |
| Reader integration managing rule | Control RFID readers existing at gate 1 and collect RFID tag data within recognition range. Control RFID readers existing at gate 2 and collect RFID tag data within recognition range. |
| Data processing rule | Arrange data lost for last 5 minutes except for duplicated data among RFID tag data collected from RFID readers of gate 1. Arrange data newly transmitted for last 5 minutes except for duplicated data among RFID tag data collected from RFID readers of gate 2. |
| Control instructions | Gate 1-433 MHz RFID reader: conform cart to which 433 MHz tag is attached. Gate 1-900 MHz RFID reader: conform item to which 900 MHz tag is attached. Gate 2-433 MHz RFID reader: conform cart to which 433 MHz tag is |

TABLE 1-continued

| List | Example |
| --- | --- |
| | attached. Gate 2-900 MHz RFID reader 1: conform item to which 900 MHz tag is attached. Gate 2-900 MHz RFID reader 2: conform item to which 900 MHz tag is attached. |
| Integrated RFID event | Gate 1: Cart 1, Cart 2, Item 1, Item 2, Item 3, Item 4 Gate 2: Cart 1, Item 1, Item 2. |
| Relation analyzing rule | Compare integrated RFID events of gates 1 and 2, and make warning report if integrated RFID events are different from each other. |
| High-level service information | Cart 2, Item 3, Item 4. |
| Service report | Cart 2, Item 3, and Item 4 passing through gate 1 do not pass through gate 2. |

Specifically, as shown in FIG. 4 and Table 1, in order to provide user's demands, the service policy managing unit 210 defines a business logic in the form that can be understood by the RFID reader, that is, "compare RFID tag data passing through a gate 1 with RFID tag data passing through a gate 2 at an interval of 5 minutes, and make a warning report unless the RFID tag data correspond to each other", as a service policy.

In this case, the reader managing unit 230 generates a reader integration managing rule on the basis of the service policy, and then transmits the reader integration managing rule to the reader controller 240. That is, the reader managing unit 230 generates a reader integration managing rule, that is, "control RFID readers existing at the gate 1 and collect RFID tag data within a recognition range", and transmits the reader integration managing rule to the reader controller 240. Further, the reader managing unit 230 generates a reader integration managing rule, that is, "control RFID readers existing at the gate 2 and collect RFID tag data within a recognition range", and transmits the reader integration managing rule to the reader controller 240.

Then, the reader controller 240 analyzes the reader integration managing rules transmitted from the reader managing unit 230, and transmits control instructions to each of the RFID readers. That is, the reader controller 240 transmits control instructions, that is, "conform a cart to which a 433 MHz tag is attached", to a 433 MHz RFID reader of the RFID readers of the gate 1, and transmits control instructions, that is, "conform an item to which a 900 MHz tag is attached", to a 900 MHz RFID reader. Further, the reader controller 240 transmits control instructions, that is, "conform a cart to which a 433 MHz tag is attached", to a 433 MHz RFID reader of the RFID readers of the gate 2, transmits control instructions, that is, "conform an item to which a 900 MHz tag is attached", to a 900 MHz RFID reader 1, and transmits control instructions, that is, "conform an item to which a 900 MHz tag is attached", to a 900 MHz RFID reader 2.

The data processing rule managing unit 220 generates a data processing rule, that is, "arrange data lost for the last 5 minutes except for duplicated data among the data collected from the RFID readers existing at the gate 1", on the basis of the service policy, and transmits the data processing rule to the collected data processing unit 250. Further, the data processing rule managing unit 220 generates a data processing rule, that is, "arrange data newly transmitted for the last 5 minutes except for duplicated data among the data collected from the RFID readers existing at the gate 2", and transmits the data processing rule to the collected data processing unit 250.

Accordingly, the collected data processing unit 250 receives RFID tag data from each of the RFID readers that are controlled in accordance with the control instructions transmitted from the reader controller 240. Further, the collected data processing unit 250 integrates RFID tag data, which are transmitted from the RFID readers existing at the gate 1, as a logical unit in accordance with the data processing rule, thereby generating an integrated RFID event. Then, the collected data processing unit transmits the generated integrated RFID event to the service information generator 260. For example, if the cart 1, cart 2, item 1, item 2, item 3, and item 4 among the RFID tag data meet the data processing rule, that is, "arrange data lost for the last 5 minutes except for duplicated data among the data collected from the RFID readers existing at the gate 1", the integrated RFID events corresponding to the RFID readers existing at the gate 1 include information about the cart 1, cart 2, item 1, item 2, item 3, and item 4.

Further, the collected data processing unit 250 integrates the RFID tag data, which are transmitted from the RFID readers existing at the gate 2, as a logical unit in accordance with the data processing rule, thereby generating an integrated RFID event. Then, the collected data processing unit 250 transmits the generated integrated RFID event to the service information generator 260. For example, if the cart 1, item 1, and item 2 among the RFID tag data meet the data processing rule, that is, "arrange data newly transmitted for the last 5 minutes except for duplicated data among the data collected from the RFID readers existing at the gate 2", the integrated RFID events corresponding to the RFID readers existing at the gate 2 include information about the cart 1, item 1, and item 2.

The service information generator 260 analyzes the correlation between the integrated RFID events in accordance with the relation analyzing rule, that is, "compare the integrated RFID events corresponding to the RFID readers existing at the gate 1 with the integrated RFID events corresponding to the RFID readers existing at the gate 2, and make a warning report unless the integrated RFID events correspond to each other". That is, the service information generator 260 compares the information about the cart 1, cart 2, item 1, item 2, item 3, and item 4 that are included in the integrated RFID events corresponding to the RFID readers existing at the gate 1, with the information about the cart 1, item 1, and item 2 that are included in the integrated RFID events corresponding to the RFID readers existing at the gate 2. Then, the service information generator generates high-level service information, that is, "the item 3, item 4, and cart 2 passing through the gate 1 did not pass through the gate 2", by using the result of the comparison.

The service report processing unit 270 transmits the high-level service information transmitted from the service information generator 260, that is, "the item 3, item 4, and cart 2 passing through the gate 1 did not pass through the gate 2", to the user or the application service in real-time.

FIG. 5 is a flowchart illustrating a process for controlling the RFID reader in the apparatus for managing an RFID reader according to the exemplary embodiment of the present invention.

As shown in FIG. 5, the service policy managing unit 210 stores a service policy in the form that can be understood by the RFID reader, in order to provide high-level service information that is desired by a user (S100).

The reader managing unit 230 generates a reader integration managing rule on the basis of the service policy, and transmits the reader integration managing rule to the reader controller 240 (S200). Then, the reader controller 240 analyzes the reader integration managing rule, and transmits control instructions to each of the RFID readers (S300).

The data processing rule managing unit 220 generates a data processing rule on the basis of the service policy, and transmits the data processing rule to the collected data processing unit 250. Further, the data processing rule managing unit 220 generates a relation analyzing rule, and transmits the relation analyzing rule to the service information generator 260 (S400).

The collected data processing unit 250 receives RFID tag data from the RFID readers, generates an integrated RFID event in accordance with the data processing rule, and transmits the integrated RFID event to the service information generator 260 (S500). Then, the service information generator 260 analyzes the correlation between the integrated RFID events on the basis of the relation analyzing rule (S600).

The service report processing unit 270 makes the analysis result in the form of a service report, and provides the service report to the user or the application service (S700).

As described above, the apparatus for managing an RFID reader according to the exemplary embodiment of the present invention manages the RFID readers having different frequency characteristics by using a standardized control method, and integrally process the RFID tag data that are received from the RFID readers having different frequency characteristics. Therefore, the apparatus for managing an RFID reader efficiently controls the RFID readers having different frequency characteristics.

In addition, it is possible to integrally control RFID readers of which frequency bandwidths are different from each other, and to generate high-level service information by integrally processing RFID tag data received by RFID readers.

Further, a user or an application service conducts business in an environment, which includes RFID readers having different frequency characteristics, without technical limitation, increase the demands of industries related to RFID, and facilitate the revitalization and popularization of RFID.

The above-mentioned exemplary embodiments of the present invention are not embodied only by a method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for managing a plurality of RFID readers having different frequency bandwidths, the apparatus comprising:

a service policy managing unit that defines demands which are desired by a user or an application service as service policies to be understood by the plurality of RFID readers, the service polices including conditions and actions corresponding to the conditions;

a data processing rule managing unit that generates a data processing rule and a relation analyzing rule on the basis of the service policies;

a collected data processing unit that receives a plurality of RFID tag data from the plurality of RFID readers, integrates a first portion of the plurality of RFID tag data in accordance with the data processing rule to generate a first integrated RFID event, and integrates a second portion of the plurality of RFID tag data in accordance with the data processing rule to generate a second integrated RFID event;

a service information generator that analyzes a correlation between the first integrated RFID event and the second integrated RFID event in accordance with the relation analyzing rule to generate service information; and a service report processing unit that provides a service report based on the service information generated from the service information generator.

2. The apparatus of claim 1, further comprising:

a reader managing unit that generates a reader integration managing rule corresponding to the plurality of RFID readers on the basis of the service policies; and a reader controller that analyzes the reader integration managing rule and transmits control instructions to each of the plurality of RFID readers.

3. The apparatus of claim 1, wherein the data processing rule comprises the contents of the processing of the plurality of RFID tag data.

4. A method performed via an apparatus to manage a plurality of RFID readers having different frequency bandwidths, the method comprising:

receiving a plurality of RFID tag data from the plurality of RFID readers;

defining demands, which are desired by a user or an application service, as service policies to be understood by the plurality of RFID readers, the service polices including conditions and actions corresponding to the conditions;

generating a data processing rule, which is used to process the plurality of RFID tag data, and a relation analyzing rule on the basis of the service policies;

integrating a first portion of the plurality of RFID tag data in accordance with the data processing rule to generate a first integrated RFID event;

integrating a second portion of the plurality of RFID tag data in accordance with the data processing rule to generate a second integrated RFID event; and analyzing a correlation between the first integrated RFID event and the second integrated RFID event in accordance with the relation analyzing rule to generate service information to be provided to the user or the application service.

5. The method of claim 4, wherein the generating of the data processing rule further comprises:

generating a reader integration managing rule, which corresponds to the plurality of RFID readers, on the basis of the service policies; and analyzing the reader integration managing rule and transmitting control instructions to each of the plurality of RFID readers.

6. A method performed via an apparatus to manage a plurality of RFID readers having different frequency bandwidths, the method comprising:

storing demands which are desired by a user or an application service as service policies that comprise conditions and actions corresponding to the conditions;

receiving a plurality of RFID tag data from the plurality of RFID readers by applying a first rule that is generated in accordance with the conditions and actions of the service policies;

converting a first portion of the plurality of RFID tag data into a first integrated RFID event by applying a second rule that is generated in accordance with the conditions and actions of the service policies;

converting a second portion of the plurality of RFID tag data into a second integrated RFID event by applying the second rule; and analyzing a correlation between the first integrated RFID event and the second integrated RFID event in accordance with a third rule that is generated in accordance with the conditions and actions of the service policies, and providing analyzed results based on the analyzing the correlation.

7. The method of claim 6, wherein the receiving of the plurality of RFID tag data further comprises analyzing the first rule and transmitting control instructions to each of the plurality of RFID readers.

8. The method of claim 6, wherein the first rule comprises a rule controlling each of the plurality of RFID readers, the second rule comprises a rule processing the plurality of RFID tag data, and the third rule comprises a rule analyzing the integrated RFID events.

* * * * *